US007671293B2

(12) United States Patent
Fry et al.

(10) Patent No.: US 7,671,293 B2
(45) Date of Patent: Mar. 2, 2010

(54) SYSTEM AND METHOD FOR DYNAMIC ALLOCATION FOR BIN ASSIGNMENT

(75) Inventors: Rick A. Fry, Berkshire, NY (US); Reed Durand, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1313 days.

(21) Appl. No.: 10/935,319

(22) Filed: Sep. 8, 2004

(65) Prior Publication Data

US 2006/0070929 A1 Apr. 6, 2006

(51) Int. Cl.
*B07C 5/00* (2006.01)
*G06F 7/00* (2006.01)
*G06K 9/00* (2006.01)

(52) U.S. Cl. ........................ 209/584; 209/900; 700/224

(58) Field of Classification Search ................. 209/584, 209/900; 700/223, 224, 226
See application file for complete search history.

(56) References Cited

U.S. PATENT DOCUMENTS

| | | | |
|---|---|---|---|
| 3,880,298 | A | 4/1975 | Habegger et al. |
| 3,929,076 | A | 12/1975 | Mcrae, Jr. et al. |
| 3,941,372 | A | 3/1976 | Matsuo |
| 4,181,947 | A | 1/1980 | Krauss et al. |
| 4,401,301 | A | 8/1983 | Hayskar |
| 4,440,492 | A | 4/1984 | Howard |
| 4,566,595 | A | 1/1986 | Fustier |
| 4,630,216 | A | 12/1986 | Tyler et al. |
| 4,641,753 | A | 2/1987 | Tamada |
| 4,672,553 | A | 6/1987 | Goldberg |
| 4,690,751 | A | 9/1987 | Umiker |
| 4,974,721 | A | 12/1990 | Born |
| 5,009,321 | A | 4/1991 | Keough |
| 5,031,223 | A | 7/1991 | Rosenbaum et al. |
| 5,072,822 | A | 12/1991 | Smith |
| 5,074,539 | A | 12/1991 | Wells et al. |
| 5,133,543 | A | 7/1992 | Eitel et al. |
| 5,226,547 | A | 7/1993 | Malatesta |
| 5,289,983 | A | 3/1994 | Ueda et al. |
| 5,353,915 | A | 10/1994 | Schneider |
| 5,398,922 | A | 3/1995 | Malatesta |
| 5,446,667 | A | 8/1995 | Oh et al. |
| 5,544,758 | A | 8/1996 | Malatesta |
| 5,706,928 | A | 1/1998 | Neukam |

(Continued)

FOREIGN PATENT DOCUMENTS

| | | |
|---|---|---|
| EP | 0575109 | 12/1993 |

(Continued)

*Primary Examiner*—Patrick H Mackey
*Assistant Examiner*—Mark Hageman
(74) *Attorney, Agent, or Firm*—Leland Schultz; Greenblum & Bernstein P.L.C.

(57) ABSTRACT

A sorting device and method for dynamically allocating bins to objects such as mail pieces. The device has at least one reading device for reading delivery information of objects and a conveying system which transports the objects. At least one feeder inducts the objects onto the conveying system. A plurality of physical bin locations are adjacent to the conveying system for storage of the object injected from the conveying system. A controller or processor dynamically assigns and reassigns sort locations, as required, to the plurality of physical bin locations during a sorting operation for each object of the objects.

22 Claims, 3 Drawing Sheets

U.S. PATENT DOCUMENTS

| | | | | |
|---|---|---|---|---|
| 5,901,855 | A * | 5/1999 | Uno et al. | 209/584 |
| 6,026,967 | A | 2/2000 | Isaacs et al. | |
| 6,059,091 | A | 5/2000 | Maier et al. | |
| 6,107,589 | A * | 8/2000 | Yamashita et al. | 209/584 |
| 6,239,397 | B1 | 5/2001 | Rosenbaum et al. | |
| 6,270,069 | B1 | 8/2001 | Cera et al. | |
| 6,279,750 | B1 * | 8/2001 | Lohmann | 209/559 |
| 6,283,304 | B1 * | 9/2001 | Gottlieb et al. | 209/603 |
| 6,328,302 | B2 | 12/2001 | Hendrickson et al. | |
| 6,390,756 | B1 | 5/2002 | Isaacs et al. | |
| 6,598,748 | B2 | 7/2003 | Mileaf et al. | |
| 6,881,916 | B2 * | 4/2005 | McLaughlin et al. | 209/584 |
| 6,892,890 | B2 * | 5/2005 | Dominguez | 209/559 |
| 6,946,612 | B2 | 9/2005 | Morikawa | |
| 7,060,928 | B2 * | 6/2006 | Jirsa | 209/584 |
| 2003/0000871 | A1 | 1/2003 | Fitzgibbons et al. | |
| 2003/0141651 | A1 | 7/2003 | Berdelle-Hilge et al. | |
| 2003/0155282 | A1 * | 8/2003 | Kechel | 209/584 |
| 2003/0155703 | A1 | 8/2003 | Zimmermann | |
| 2004/0251180 | A1 * | 12/2004 | McDonald | 209/584 |

FOREIGN PATENT DOCUMENTS

| | | |
|---|---|---|
| WO | 9824564 | 6/1998 |

* cited by examiner

SYSTEM AND METHOD FOR DYNAMIC ALLOCATION FOR BIN ASSIGNMENT

BACKGROUND OF THE INVENTION

1. Field of the Invention

The invention generally relates to a system and method of bin allocation and, more particularly, to a system and method for dynamically allocating bin assignments during a sort process.

2. Background Description

The sorting of mail is a very complex, time consuming task. In general, the sorting of mail is processed though many stages, including back end processes, which sort or sequence the mail in delivery order sequence. These processes can either be manual or automated, depending on the mail sorting facility, the type of mail to be sorted such as packages, flats, letter and the like. A host of other factors may also contribute to the automation of the mail sorting, from budgetary concerns to modernization initiatives to access to appropriate technologies to a host of other factors.

In general, however, most modern facilities have taken major steps toward automation by the implementation of a number of technologies. These technologies include, amongst others, letter sorters, parcel sorters, advanced tray conveyors, flat sorters and the like. As a result of these developments, postal facilities have become quite automated over the years, considerably reducing overhead costs.

But, in implementation, many of these systems are constrained by their physical limitations. For example, currently, it is known to sequence letters using a mail sorter having a number of physical bin locations, e.g., about 100 bin locations. So, when sorting the mail, only 100 bin locations can be used regardless of the size of the delivery route, density of the delivery route and other considerations. Of course, though, other known number of bin allocations can equally be used to sort letters, a host of them readily available and known to those of ordinary skill in the art.

In use, each bin location has a tray or container associated with the bin location, itself, for storage of the mail pieces during the sorting process. For example, during the sorting of mail pieces such as flats (e.g., magazines, newspapers and the like), each of the mail pieces for a particular delivery route and more specifically a segment of a delivery route is inducted into a specific pre-allocated bin location. In the bin location, a tray is provided for storing of the mail piece prior to delivery. In a typical system, the tray is capable of holding between 65 and 85 flats, depending on the size of the flats.

But, these systems are preprogrammed with a bin allocation for a specific route or sort plan, for example, in advance of the sorting process. These bin allocations are typically provided based on historical data for that specific route and stored in a look-up table. By way of illustration, the system is programmed based on a density of mail pieces for a particular segment of a delivery route. The "high density" portion of the route would be allocated to the most easily accessible bin locations in order to make it easier for an operator to manually unload the tray and place a new tray in its place for further mail induction. In other words, the programmer or technician, based on historical data, can segment the bins into "break out" sections for a particular neighborhood or delivery route.

But, these systems and sort plans cannot take into consideration many situations that may impact the efficiency of the system. For example, once a sort plan is defined ahead of time, it cannot be changed during the sorting operation. Thus, if the density pattern changes for a particular day, the system still remains constrained to the pre-programmed sort plan. This may lead to an inefficiency in the system by having bin locations allocated to lower density routes bearing the burden of higher density sorts, despite historical trends.

Although the sort plan itself cannot be changed, the operator has the ability to assign a specific bin to another location through a manual operation by identifying. This can override the sort plan definition for the duration of the run, or until changed. But, this manual process is too slow to feasibly address any real-time dynamic allocation, and it is a function of the operator's selection, as opposed to a system decision based on system knowledge.

Additionally, in order to utilize known systems and sorting plans, each tray within a bin location has to be physically removed and replaced upon filling of such tray. This is referred to as a "swap". To accomplish this swap, the operator may manually remove the trays and exchange such tray with an empty tray within that bin location. This process may also be automated. But during this swap there may be a delay in placing a new tray in the bin location. Thus, one of three situations may result:

(i) the bin location may have to be disabled so to avoid mail spillage; or (ii) the bin location is not disabled and mail spillage occurs; or (iii) there is a mail jam resulting from mail spillage or other user induced incidence resulting from the swap.

In any of these situations, the potential for impacting the ability to sort mail pieces properly is greatly increased. In other words, the efficiency of the system can be greatly reduced during this swap process.

Additionally, due to the complexity of these sorting systems, there is a possibility that an actuator, pneumatic device or other mechanical system (used to induct mail into the trays) may fail or wear down during the sorting operations. When these devices wear down or fail (or misfire), a greater error rate will occur thus, again, impacting the efficiency of the system. That is, the associated bin location will no longer be available thus reducing the throughput of the system.

In current systems, these error rates may be monitored. However, to compensate for these error rates, the sort order has to be manually adjusted, by disabling a particular bin location and manually reallocating it to another bin location. This is a complex procedure and cannot be performed during the sorting operations. Thus, the system is taken off-line, reprogrammed and then placed back into service. In the alternative, there may be a manual override of the sort plan to reallocate the bins, as discussed above. In either situation, this is very labor intensive, adding to the downtime and hence inefficiency of the system.

The invention is directed to overcoming one or more of the problems as set forth above.

SUMMARY OF THE INVENTION

In a first aspect of the invention, a sorting device has at least one reading device for reading delivery information of objects and a conveying system which transports the objects. At least one feeder inducts the objects onto the conveying system. A plurality of physical bin locations are adjacent the conveying system for storage of the object injected from the conveying system. A controller dynamically assigns and reassigns sort locations (and also buffer locations), as required, to the plurality of physical bin locations during a sorting operation for each object of the objects based on a predetermined criteria.

In another aspect of the invention, a method includes reading delivery information from objects and determining density range information of the objects from the delivery information. The method assigns and reassigns sort locations to a plurality of physical bin locations based on the density range information and objects being inducted into the sort locations.

In yet another aspect of the invention, the method includes assigning low density bin regions and high density bin regions associated with a plurality of physical bin locations based on density range information of the objects and assigning and reassigning sort locations, based on the density information and availability of the physical bin locations, to the low density bin regions and high density bin regions for storing sorted low density range objects and high density range objects, respectively.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF EMBODIMENTS OF THE INVENTION

The invention is directed to, for example, a system and method for dynamically allocating bin locations during a sorting operation based on different considerations. One such consideration for dynamically allocating bin location may be the density range of the mail pieces for a particular segment of the delivery route, as calculated during the sorting operations. This reduces manually programming the sort plan for assigning bin allocations. In this aspect of the invention, the sorting system and method can change bin allocation based on density profiles from day to day in order to provide a best case sort scenario.

The system and method of the invention is further capable of expanding the physical capacity of the sorting system by dynamically assigning sorting locations to physical bin locations during the sorting operations. In one implementation, the system can be increased by 100%. Also, in the system and method of the invention, swapping of trays can be provided without mail spillage or pausing the system. Thus, the system and method of the invention significantly reduces processing times for sequencing mail pieces or other objects. Also, the flats and mail pieces can generally be described as objects applicable to a host of other applications such as warehousing and storage applications all contemplated for use with the invention.

System of the Invention

Figure 1:
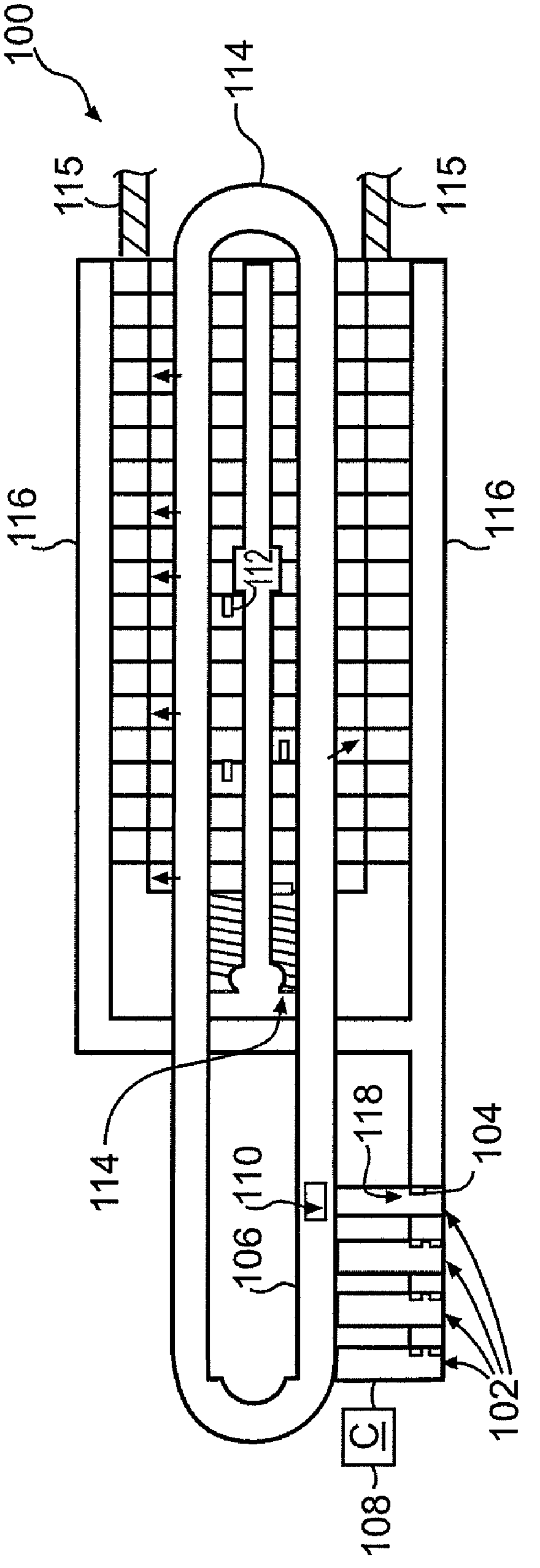
FIG. 1 shows a schematic diagram of the sorting device of the invention.

Referring now to FIG. 1, a schematic diagram of a sorting system used with the invention is shown. It should be understood that the sorting system of FIG. 1 is provided for illustrative purposes and that the system and method of the invention can equally be used with other sorting and/or sequencing systems such as, for example, those manufactured by Lockheed Martin Corporation.

In the embodiment of FIG. 1, the sorting system is generally depicted as reference numeral 100 and includes at least one feeder 102. In embodiments, the at least one feeder 102 is a flat feeder with a feed rate capacity of approximately 10,000 flats per hour. However, it should be understood by those of skill in the art that the feeder may equally be a letter feeder or several feeders of either type, in any combination with feeding capacity rates known to those of skill in the art.

The feeders 102 may each include a scanning device 104 such as, for example, an optical character recognition device (OCR), bar code scanner or the like provided adjacent or proximate a feed track 106 or on the feeders 102. The OCR 104 communicates with a controller 108 via an Ethernet, Local Area Network, Wide Area Network, Intranet, Internet or the like. In one particular application, for illustration, the OCR 104 will capture information such as, for example, address destination information, from the flats (e.g., known generally as mail pieces). Once the information is captured, it will be sent to the central processing unit (e.g., controller 108) for interpretation and analysis, e.g., to determine density patterns of the mail pieces. Using this information, the controller 108 can provide instructions to any the components of the invention for dynamically allocating bin locations for sequencing of the mail pieces, as discussed in more detail below.

In use, the feeders 102 are designed to deposit mail pieces into carriers or pockets 110 for transport to holding trays 112 positioned at respective bin locations 114. In one embodiment, 100 physical bin locations are provided on the system. The use of 100 physical bin locations should not be construed as a limiting feature of the invention and, accordingly, it is contemplated that the system may have any number, "n", of physical bin locations.

In one aspect of the invention, the holding trays 112 may be transported to the bin locations by any known conveying system 115 or, alternatively, manually placed at each bin location 114. Similarly, the holding trays 112 may be removed from the bin locations 115 by a conveying system 116. Both the conveying systems 115 and 116 may be belt driven or roller driven conveyor systems well known in the art. In one implementation using a two pass system, the conveying system 116 may carry the holding trays (i) back to the feeders 102 for a second pass of the mail pieces or (ii) in a sequential delivery order to an unloading area for future delivery or storage after the second pass is complete.

A mail thickness device 118 may also be used to measure the thickness of each mail piece as it passes through the system. The flat thickness device may be any known measuring device such as a shaft encoder, for example. The flat thickness device 118 may be used to determine when a tray is completely filled, as discussed below.

Figure 2:
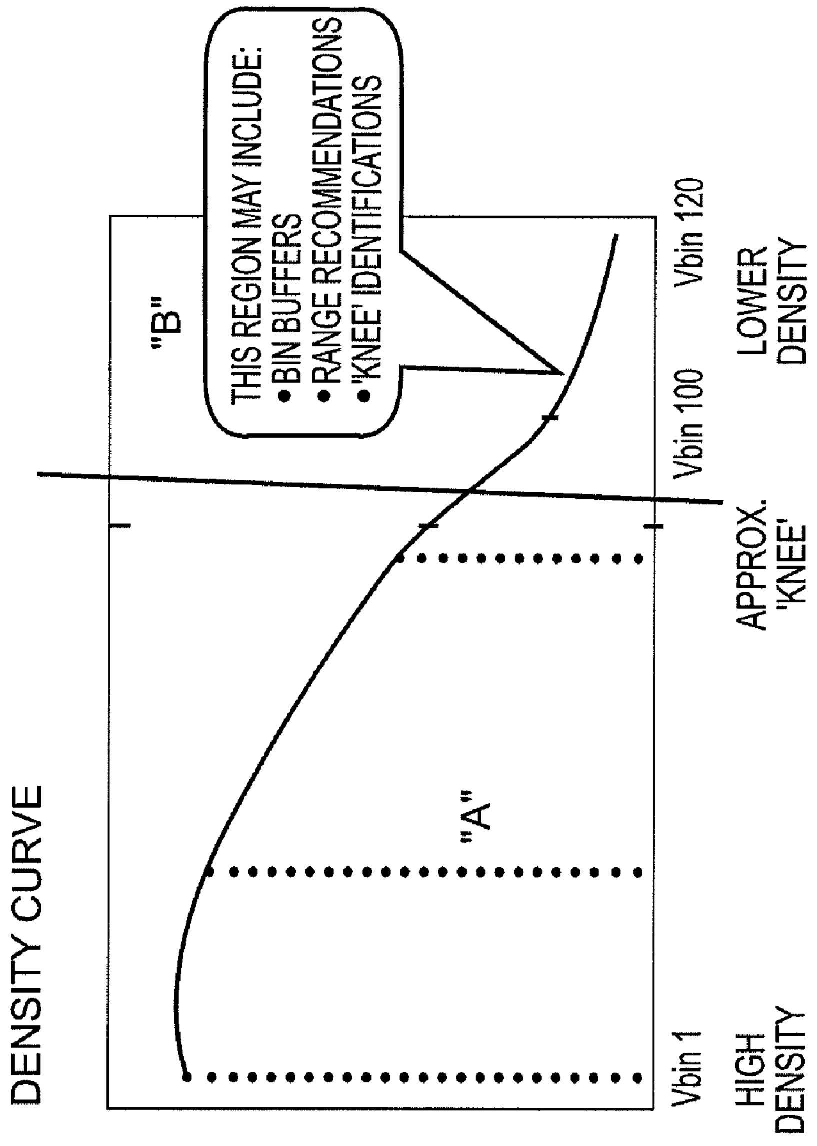
FIG. 2 is a density curve for a delivery route(s) in accordance with the invention.

FIG. 2 shows a density curve of mail pieces in accordance with the invention. It should be understood that the density curve of FIG. 2 is only one illustrative example and that other density curves and dynamic bin allocation schemes are contemplated for use by the invention. The density curve of FIG. 2 may be based on historical data accumulated over several sorting operations, days, or other time periods, calculated by the controller, in one example.

The density curve of FIG. 2 shows high density and low density ranges for a particular sorting operation, designated as sections "A" and "B", respectively. In the illustration of FIG. 2, the low density regions may be representative of a density associated with 2% or less of the mail pieces known to be inducted into specific sort locations for a sort operation. In accordance with the invention, the bin locations may be allocated dynamically to certain bin locations during the sort operation based on such density curve, thus adding additional capacity to the system.

In accordance with one implementation of the invention, as higher density mail pieces are fed through the system, a physical bin location initially used as a lower density sort location (in section "A") may have its tray ejected in order to accommodate the higher density mail pieces, for example. In this manner, the physical bin location will be reassigned, dynamically, to accommodate the higher density mail pieces based on the density of the mail pieces for that particular segment of the delivery route. Accordingly, one physical bin location may represent two or more sort locations (bin assignments) based on density allocations. These bin assignments, as discussed below, are assigned during the sorting operation based on a particular mode or modes of operation.

Using the example of FIG. 2, 100 physical bin locations are available within the system. However, using historical density allocations, the system may assign 120 sort locations for the 100 bin locations. In this one example, initially, physical bin locations 1-85 may be defined as high density locations and physical bin locations 86-95 may be defined as low density bin locations. Additionally, bin locations 96-100 may be designated, for example, as a reject bin, no read bin, out-of-sort plan bin and buffer bins. However, it should be understood that any of the bin locations may be assigned, initially, the high density, low density and special bin designations depending on the accessibility of the physical bin locations and other user defined factors.

Still using the example of FIG. 2, although there are only 100 physical bin locations, the controller of the invention performs a sort calculation based on 120 sort locations. By using 120 sort locations, the method of the invention increases the capacity of the system by 20% (e.g., 100 physical bin locations compared to 120 sort locations). The sort location assignment (also referred to as bin assignment) may be performed by the controller 100 based on delivery information read from the OCR, for example, and the user's desire to have 120 bin assignments, in conjunction with any known sorting algorithm. Thus, once it is determined that 120 sort locations are to be used in the system, a conventional sorting algorithm may be used calculate a sorting operation.

Once a sorting operation is calculated, the system may inject a mail piece with a bin assignment of 115, for example, into a physical bin location defined as a sort location 115. Although at this time there is no bin location to accommodate the sort location 115, the process may be performed by, for example, (i) determining a low density bin location, (ii) swapping trays in the low density bin location and (iii) using the bin location with the swapped tray as the new sort location for bin assignment 115, for example. In an alternative step to (iii), the system may use a buffer bin location for the new sort location for bin assignment 115 and reassign the bin location with the swapped tray as a new buffer bin location for future use.

Thus, it should now be understood in view of the above illustration, even though there is no physical bin location for a bin assignment (sort location), the method of the invention may use a low density bin location, e.g., physical bin location, reassign this bin location as a now needed bin location and then induct the mail piece into the tray of this physical bin location. Alternatively, a buffer bin location may be used in accordance with the above discussion. In this manner, the method of the invention may be used to expand the capacity of the system.

To further describe the use of the buffer bin, in an alternative or concurrent mode of operation, the system and method may designate a buffer bin as the new sort location. By designating the buffer bin in such a manner, the system will not have to pause or interrupt operations for a tray swap. Instead, the buffer bin may be used as the new sort location (bin assignment), and concurrently or simultaneously, a tray in a designated lower density bin location may be ejected from the system and reassigned as the buffer bin for future use.

In yet another mode of operation, the system and method may be used to monitor high error rate bin locations as well as when a high density tray is filled within a particular physical bin location. In the case that a high density tray is filled, the tray in the buffer bin may be reassigned to the high density bin location number so that the filled tray can be swapped with a new, empty tray, in the previous bin location. The bin location with the empty tray will now be reassigned as the buffer bin, dynamically, during sorting operations. Alternatively, a lower density tray can be ejected from a bin location and swapped with an empty tray. This lower density bin location can then be reassigned to the same sort location designation for the high density mail pieces for future filling of the tray. In either scenario, the efficiency of the system increases since there is no requirement to pause the sorting operation, or the possibility that mail spillage will occur during the swapping process.

In the case of high error rate bin locations, such as a bin location with a faulty mechanical system, the buffer bin may be used as the new bin assignment, equivalent to that of the high error rate bin location. The high error rate bin location may then be taken "off-line" for subsequent maintenance without the need to pause the sorting operations. However, the system will remain in operation and simply reassign the bin location with the high error rate to another bin location.

Alternatively, a lower density bin location may be used, as described above. Again, in either scenario, the efficiency of the system increases since there is no requirement to pause or interrupt the sorting operation, or the possibility that mail spillage will occur during the swap process.

As should now be understood, the modes described above may work in combination or exclusively of one another. Also, the system may be expanded upwards of and equaling 100% by dynamically allocating several sort locations to each physical bin location, as needed.

Figure 3:
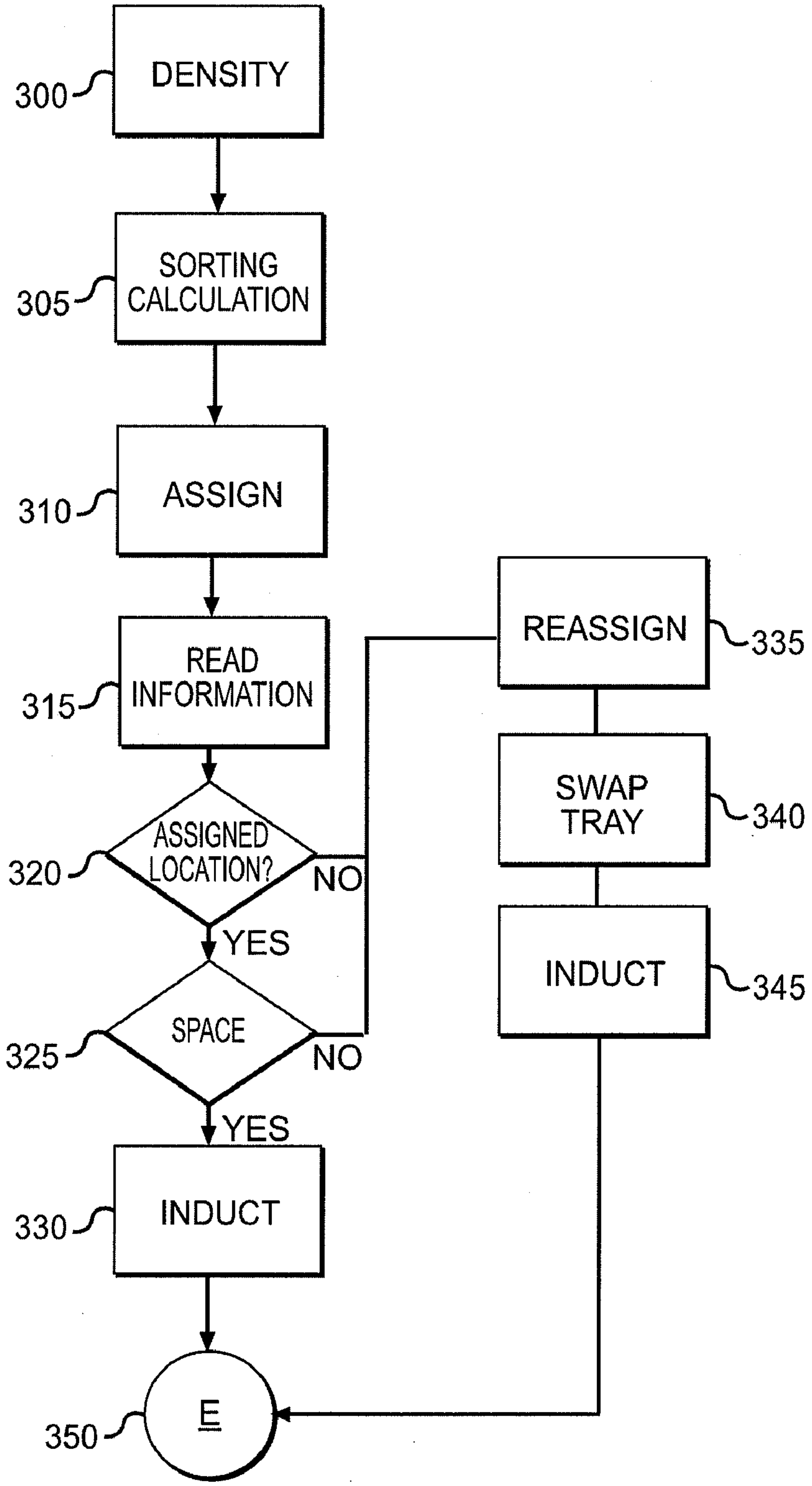
FIG. 3 is a flow diagram showing steps implementing the method of the invention.

FIG. 3 is a flow chart implementing the steps of the invention as described above. The steps of the invention may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation or the sort computer over the Internet or some other type of network. FIG. 3 may equally represent a high-level block diagram of the system of the invention, implementing the steps thereof.

At step 300, the system and method determines the density of mail piece ranges based on historical data and/or information being read from the mail pieces as they are being fed into the system. At step 305, the system and method calculates a sorting operation based on the delivery routes as well as the number of sort location assignments. The number of sort locations or bin assignments "$b_n$+x" is, in one embodiment, greater than the number of physical bin locations "$b_n$".

At step 310, the system and method will assign sort locations "$b_n$-y" to the physical bin locations "$b_n$" based on the ranges of density of mail pieces and the best system location as the mail pieces are inducted into the system. The remaining bin locations "y" will be assigned as buffer bin locations and/or reject bin locations or other special bin designations, for example. In one implementation, the bin assignments or sort locations may be assigned to physical bin locations during the sorting operation, as they occur.

In one example, (i) $b_n$=100, (ii) x=20, (iii) $b_n$+x=120, (iv) y=5, and (v) $b_n$−y=95.

It should be appreciated by those of skill in the art that the above set of ranges is one example contemplated by the invention. Accordingly, the above ranges should not be considered a limiting feature of the invention and are provided for illustration purposes only. Thus, it should be understood that other ranges are also contemplated for use with the invention.

At step 315, information is read from the mail pieces. At step 320, a determination is made as to whether a physical bin location has been assigned or is available for the particular mail piece. For example, if a mail piece associated with a low density range is inducted into the system, the method can assign this mail piece to an existing bin location in the low density region which has not been previously assigned.

If a bin location has been assigned, a determination may be made as to whether there is any further space in the tray within the assigned physical bin location to accommodate the mail piece, at step 325. This may be accomplished by either using the mail thickness device or a sensor such as a photodiode at the bin location to measure the height of the mail within the tray. If there is additional space within the tray, the mail piece is inducted into the tray at step 330.

If there is no additional space or a physical bin location has not been assigned or is not available for this mail piece, at step 335, a low density range mail piece bin location may be reassigned to accommodate the mail piece, during sorting operation. In an alternative embodiment, a buffer bin may be reassigned to accommodate the mail piece, during the sorting operation. In either scenario, at step 340, the tray for a low density range mail piece bin location will be swapped for a new, empty tray. The ejected tray will be labeled, accordingly, in order to identify the mail route, segment or ordering of the tray in a sequence.

If a buffer bin location was reassigned, the bin location with the new, empty tray may be designated as a buffer bin for future use. In this manner, the buffer bin will allow the system to change or reassign bin locations for a specific sort location without interrupting the mail stream. Also, the buffer bin, as should be understood, may be reassigned many times during the sorting operations, depending on availability of bin locations for the sort operation. The mail piece will be inducted into the tray of the previously assigned buffer location or the new, empty tray at step 345. This process may repeat until the sorting process is complete. The process ends at step 350.

By using the method of the invention, the efficiency of the system increases since there is no requirement to pause or interrupt the sorting operation, or the possibility that mail spillage will occur during the swap process. Additionally, the system may now be expanded to accommodate more sort locations than there are physical bin locations, i.e., increase sort capability beyond existing physical bin count. Additionally, using the system and method of the invention will allow the dynamic allocation of sort locations, based on historical density patterns or on current density patterns.

EXAMPLE OF USE

During the sorting operation, the system maintains track of the densities of delivery routes by having the OCR read the mail information, sending this mail information to the controller 108 which, in turn, processes the information to determine the varying density ranges for each allocated sort location. In an alternative mode, the density ranges of the mail pieces may be based on historical information.

By determining the respective density ranges, the controller can automatically dictate the bin allocation for a sort location based on density of the mail pieces for a mail route as the sorting operation occurs. So that, over a period of time, if there are changes to the sorting densities of a particular sorting operation, the system and method can now reallocate the bin locations from day to day based on the previous history. This allows the mail routes with the highest density ranges to be allocated bin locations at the most optimal sort location, e.g., inducting the higher density segments of the mail route at lower error rate bin locations or more accessible locations.

Additionally, during the sorting operation, the system and method may also be used to monitor the error rate of the system and dynamically allocate bin locations based on such error rates. For example, the system and method is capable of monitoring a misfiring or other malfunction of the induction system used to induct the mail pieces into the tray within the bin location. These misfiring or malfunctions may be monitored by any known means well known in the art. If the system and method determines that there is a high error rate due to a mechanical malfunction or a misfiring, for example, the bin allocation may be changed, dynamically, to allow the mail pieces to be inducted to another bin location.

Using a specific example, the following assumptions and ranges are applied:

(i) the operator defines 120 of the highest density regions;

(ii) the operator defines 5 buffer bin allocations; and (iii) the system uses 95 bins, initially, as the sorting bins.

The system begins to fill the trays in each physical bin based on the first 95 identified regions, as they occur. If a mail piece assigned to another region or another bin definition that has not yet been assigned to one of the 95 bins, for example, bin allocation 115, a new assignment of bin allocation 115 is made to one of the five buffer bins. In parallel, the tray in the lowest or one of the lowest density bins will be ejected and labeled and a new tray will be placed in this bin location. The low density bin may represent 2% or less of the mail stream, in one example.

The low density mail bin now becomes a buffer bin so that the next time a non allocated mail piece is provided, the buffer bin can be redefined and made available for mail induction. In this manner, the buffer bins would bounce around the different hundred physical bin locations. Also, the preference of the system is to always to have the most often used bins physically on the machine (e.g., 100 bins).

In one illustrative example, a low density and high density region can be defined within the system using the density curve of FIG. 2. In one embodiment, the assignment of the mail pieces with the highest density ranges for a particular delivery route will be assigned to the most accessible physical locations (best system location) to facilitate the swapping of trays, as required. Accordingly, the "break-out" of bin segments may be based on the density range of mail pieces; instead of zip codes, for example.

While the invention has been described in terms of embodiments, those skilled in the art will recognize that the invention can be practiced with modification within the spirit and scope of the appended claims.

We claim the following:

1. A sorting device, comprising:

at least one reading device for reading delivery information of objects;

a conveying system which transports the objects;

at least one feeder for inducting the objects onto the conveying system;

a plurality of physical bin locations adjacent the conveying system for storage of the objects injected from the conveying system; and a controller assigning and reassigning sort locations, as required, to the plurality of physical bin locations during a sorting operation for each object of the objects based on a predetermined criteria, wherein a number of sort locations is greater than the physical bin locations, wherein the controller determines an error rate for a bin location of the plurality of bin locations and if the error rate is above a trigger, the controller stops induction to the objects into the bin location and reassigns another bin location as a same sort location for induction of the objects for that sort location.

2. The device of claim 1, wherein the number of the plurality of physical bin locations is "n" and the sort locations is at least "n+1".

3. The device of claim 1, wherein the controller reassigns the sort locations as the objects are inducted.

4. The device of claim 1, wherein the controller defines low density range bins and high density range bins of the plurality of physical bin locations based on the density range of each of the objects based on the predetermined criteria.

5. The device of claim 4, wherein the controller defines the high density range bins based on accessibility to the high density range bins.

6. The device of claim 1, wherein the controller defines buffer bins which are interchangeably used as either low density range bins or high density range bins of the plurality of physical bin locations based on the density ranges.

7. The device of claim 6, wherein the buffer bins store the objects when the controller determines that one of (i) all of the plurality of physical bin locations assigned sort locations are filled and (ii) a sort location for the objects has not been previously assigned or reassigned to one of the plurality of physical bins.

8. The device of claim 1, wherein the object is a mail piece.

9. The device of claim 1, wherein the controller:

determines whether a physical bin location of the plurality of physical bin locations has been assigned a sort location for a newly inducted object;

if yes, determines whether the physical bin location is not available;

if yes, defines a buffer bin of the plurality of physical bin locations as a sort location for the newly inducted object; directs the newly inducted object to the defined buffer bin; and defines the not available physical bin location as a new buffer bin after a swap of trays.

10. The device of claim 1, wherein the controller:

determines whether a physical bin location of the plurality of physical bin locations has been assigned a sort location for a newly inducted object;

if no, defines a buffer bin of the plurality of physical bin locations as a sort location for a newly inducted object;

directs the newly inducted object to the defined buffer bin; and defines a low density bin of the physical bin locations as a new buffer bin after a swap of trays.

11. The device of claim 1, wherein the predetermined criteria is density ranges of the objects based on the delivery information as calculated by the controller.

12. The device of claim 1, wherein the controller initially allocates the physical bin locations for the sort locations based on historical density information of objects for a particular segment of a delivery route.

13. The device of claim 1, wherein the controller reassigns a low density bin location of the physical bin locations to a sort location which is greater than a number of original physical bin locations.

14. A method of sorting, comprising the steps of:

reading delivery information from objects;

determining density range information of the objects from the delivery information;

initially allocating a plurality of physical bin locations for sort locations based on historical density information of objects for a particular segment of a delivery route;

assigning and reassigning the sort locations to defined density bin locations associated with a plurality of physical bin locations based on the density range information and objects being inducted into the sort locations; and determining an error rate for a bin location of the plurality of physical bin locations and if the error rate is above a trigger, stopping induction of the objects into the bin location and reassigning another bin location as a same sort location for induction of the objects for that sort location, wherein the assigning and reassigning the sort locations includes assigning a greater number of sort locations to a smaller number of physical bin locations.

15. The method of claim 14, wherein the reassigning of sort locations occurs when one of (i) the assigned sort locations are filled with objects and (ii) a sort location has not been assigned for a newly inducted object.

16. The method of claim 14, further comprising:

determining whether a physical bin location of the plurality of physical bin locations has been assigned a sort location for a newly inducted object;

if yes, determining whether the physical bin location is not available;

if yes, defining a buffer bin of the plurality of physical bin locations as a sort location for the newly inducted object;

directing the newly inducted object to the defined buffer bin; and defining the not available physical bin location as a new buffer bin after a swap of trays.

17. The method of claim 14, further comprising:

determining whether a physical bin location of the plurality of physical bin locations has been assigned a sort location for a newly inducted object;

if no, defining a buffer bin of the plurality of physical bin locations as a sort location for a newly inducted object;

directing the newly inducted object to the defined buffer bin; and defining the filled physical bin location as a new buffer bin after a swap of trays.

18. The method of claim 14 wherein same sort locations of the sort locations are assigned to different bin locations of the plurality of physical bin locations.

19. A method of sorting, comprising the steps of:

reading delivery information from objects;

determining density range information of the objects from the delivery information to allocate physical bin locations for sort locations;

assigning low density bin regions and high density bin regions associated with a plurality of physical bin locations based on the density range information;

assigning and reassigning sort locations, based on the density information and availability of the plurality of physical bin locations, to the low density bin regions and high density bin regions for storing sorted low density range objects and high density range objects, respectively; and determining an error rate for a bin location of the plurality of bin locations and if the error rate is above a trigger, stopping induction of the objects into the physical bin location and reassigning another physical bin location as a same sort location for induction of the objects for that sort location, wherein at least the assigning and reassigning includes assigning a greater number of sort locations to a smaller number of physical bin locations.

20. The method of claim 19, wherein the assigning and reassigning of sort locations occurs when one of (i) the assigned sort locations are filled with objects and (ii) a sort location has not been assigned for a newly inducted object.

21. The method of claim 19, further comprising:

determining whether a physical bin location of the plurality of physical bin locations has been assigned a sort location for a newly inducted object, and one of:

if yes, determining whether the physical bin location is not available, if yes, defining a buffer bin of the plurality of physical bin locations as a sort location for the newly inducted object, directing the newly inducted object to the defined buffer bin, and defining a not available physical bin location as a new buffer bin after a swap of trays, and if no, defining a buffer bin of the plurality of physical bin locations as a sort location for a newly inducted object, directing the newly inducted object to the defined buffer bin, and defining the not available physical bin location as a new buffer bin after a swap of trays.

22. The method of claim 19, wherein the objects are mail pieces.

* * * * *